(12) United States Patent
Uebelacker et al.

(10) Patent No.: US 9,381,839 B2
(45) Date of Patent: Jul. 5, 2016

(54) VEHICLE SEAT AND METHOD FOR PRODUCING AN UPHOLSTERED VEHICLE SEAT PART

(71) Applicant: GRAMMER AG, Amberg (DE)

(72) Inventors: Roland Uebelacker, Pfreimd (DE); Gerald Herbst, Sulzbach-Rosenberg (DE)

(73) Assignee: Grammer AG, Amberg (DE)

( * ) Notice: Subject to any disclaimer, the term of this patent is extended or adjusted under 35 U.S.C. 154(b) by 203 days.

(21) Appl. No.: 13/716,477

(22) Filed: Dec. 17, 2012

(65) Prior Publication Data

US 2013/0161998 A1 Jun. 27, 2013

(30) Foreign Application Priority Data

Dec. 22, 2011 (DE) .................. 10 2011 121 991

(51) Int. Cl.
*B60N 2/58* (2006.01)
*B60N 2/64* (2006.01)
*B60N 2/70* (2006.01)

(52) U.S. Cl.
CPC ............... *B60N 2/58* (2013.01); *B60N 2/5891* (2013.01); *B60N 2/646* (2013.01); *B60N 2/70* (2013.01); *Y10T 29/481* (2015.01)

(58) Field of Classification Search
USPC ..................... 297/452.38, 452.58
See application file for complete search history.

(56) References Cited

U.S. PATENT DOCUMENTS

| | | | | |
|---|---|---|---|---|
| 4,115,170 A * | 9/1978 | Sanson | ............................ | 156/79 |
| 4,718,153 A * | 1/1988 | Armitage et al. | .............. | 29/91.1 |
| 4,772,070 A * | 9/1988 | Leto et al. | ................ | 297/228.12 |
| 5,016,941 A * | 5/1991 | Yokota | ..................... | 297/452.61 |
| 5,225,267 A * | 7/1993 | Ochi et al. | .................... | 428/214 |
| 5,520,438 A * | 5/1996 | Stulik | .................... | A47C 1/023 297/284.11 |
| 5,544,942 A * | 8/1996 | Vu Khac et al. | ......... | 297/452.37 |
| 5,607,201 A * | 3/1997 | Irie et al. | .................. | 297/452.62 |
| 5,669,799 A * | 9/1997 | Moseneder et al. | .......... | 442/374 |
| 6,003,950 A * | 12/1999 | Larsson | .................... | 297/452.42 |
| 6,371,562 B1 * | 4/2002 | Yoshimura et al. | ...... | 297/452.61 |
| 6,817,675 B2 * | 11/2004 | Buss et al. | ................ | 297/452.6 |
| 7,588,288 B2 * | 9/2009 | Bajic et al. | ............... | 297/180.14 |
| 7,775,602 B2 * | 8/2010 | Lazanja et al. | ........... | 297/452.42 |
| 8,240,759 B2 * | 8/2012 | Hobl | .................... | B60N 2/5825 297/218.1 |
| 8,919,887 B2 * | 12/2014 | Fujita | ....................... | B60N 2/70 297/452.55 |
| 2008/0217967 A1 * | 9/2008 | Bajic et al. | ............... | 297/180.13 |
| 2008/0246325 A1 * | 10/2008 | Pfahler et al. | ............ | 297/452.42 |
| 2009/0051206 A1 * | 2/2009 | Fujita | ........................ | 297/452.49 |
| 2009/0295215 A1 * | 12/2009 | Galbreath | ............ | A01K 1/0272 297/452.6 |
| 2010/0327648 A1 * | 12/2010 | Livengood | ............... | B60N 2/58 297/452.61 |
| 2015/0335168 A1 * | 11/2015 | Favata | .................... | A47C 27/15 297/452.61 |

FOREIGN PATENT DOCUMENTS

DE 102007027496 1/2008

* cited by examiner

*Primary Examiner* — David E Allred
(74) *Attorney, Agent, or Firm* — Sheridan Ross P.C.

(57) ABSTRACT

The invention relates to a vehicle seat having a seat part, having a backrest part and having an upholstery part for upholstering the seat part, wherein the upholstery part comprises an upholstery part cover element, a carrier layer element for supporting the upholstery cover element, an upholstery core element, a main upholstery element and a barrier layer, and wherein the main upholstery element is spatially separated by the barrier layer from the carrier layer element, the upholstery core element and the upholstery part cover element, the barrier layer having a seamless barrier layer element, which is arranged continuously as a strip product directly on the main upholstery element.

9 Claims, 1 Drawing Sheet

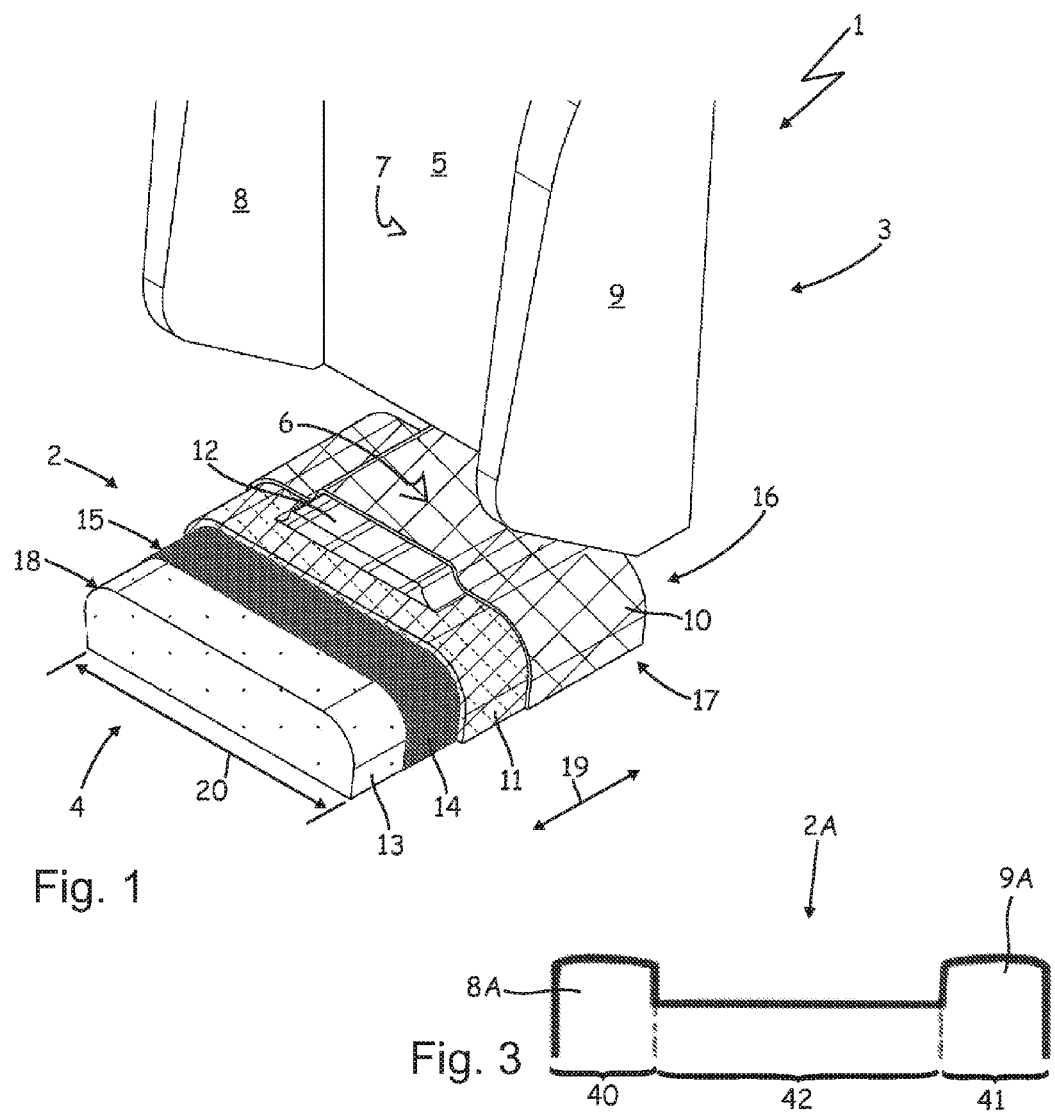
Fig. 1
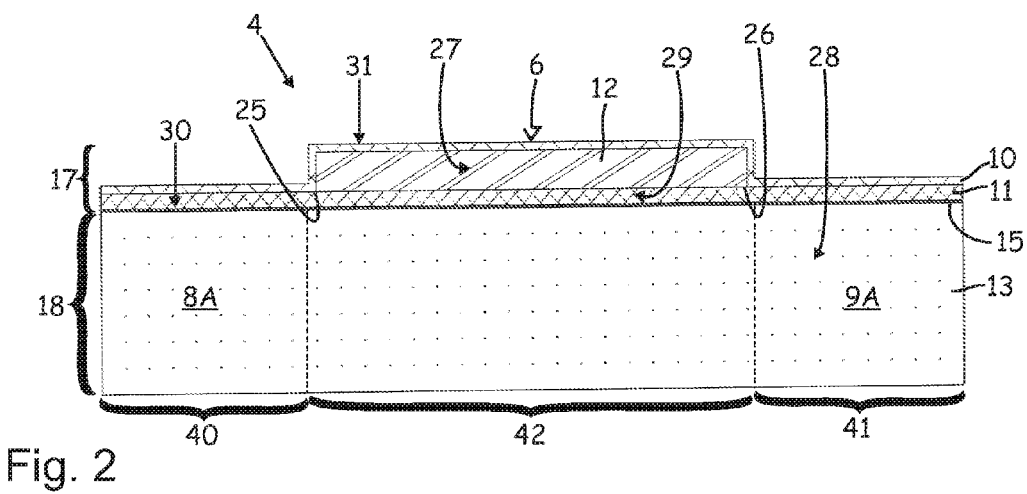
Fig. 3
Fig. 2

VEHICLE SEAT AND METHOD FOR PRODUCING AN UPHOLSTERED VEHICLE SEAT PART

CROSS REFERENCE TO RELATED APPLICATIONS

This application claims the benefit of German Application No. 10201121991.2 filed Dec. 22, 2011, the contents of which are incorporated herein by reference.

The invention relates to a vehicle seat having a seat part, having a backrest part and having an upholstery part for upholstering the seat part, wherein the upholstery part comprises an upholstery part cover element, a carrier layer element for supporting the upholstery cover element, an upholstery core element, a main upholstery element and a barrier layer, and wherein the main upholstery element is spatially separated by the barrier layer from the carrier layer element, the upholstery core element and the upholstery part cover element.

The invention also relates to a method for producing an upholstered vehicle seat part, in which at least one upholstery cover element, one carrier layer element for supporting the upholstery cover element and one barrier layer element are connected to one another to form a material web, which can then be made up to form an upper unit of the upholstered vehicle seat part.

Generic vehicle seats and methods for producing upholstered vehicle seat parts in this regard are diverse and well known from the prior art. In these upholstered vehicle seat parts, an upholstery cover element and a carrier layer element optionally also associated with this upholstery cover element are often laminated with a barrier layer film. In this case, the barrier layer film is foam-backed with the actual upholstery of the vehicle seat, so that a compact upholstered vehicle seat part is available as a whole. A compact upholstered vehicle seat part of this type has, however, hitherto been very expensive to produce.

The object of the invention is, in particular, to develop generic upholstered vehicle seat parts in such a way that especially the overall production of vehicle seats becomes simpler and therefore more economical.

The object of the invention is achieved by a vehicle seat having a seat part, having a backrest part and having an upholstery part for upholstering the seat part, wherein the upholstery part comprises an upholstery part cover element, a carrier layer element for supporting the upholstery cover element, an upholstery core element, a main upholstery element and a barrier layer, and wherein the main upholstery element is spatially separated by the barrier layer from a carrier layer element, the upholstery core element and the upholstery part cover element, the vehicle seat being characterized in that the barrier layer has a seamless barrier layer element, which is arranged continuously as a strip product directly on the main upholstery element.

Since the barrier layer has a seamless barrier layer element configured as a strip product, the present upholstery part can be produced as a whole in a structurally simple manner and therefore also exceptionally easily in terms of the process, which is enormously important, in particular with relatively high piece numbers, and provides a substantial competitive advantage.

Moreover, the seamless barrier layer is particularly robust and therefore, advantageously, also ideally completely functional over the entire service life of the vehicle seat when it is configured continuously, in other words in one piece, and therefore interacts as a homogeneous structure per se with the main upholstery element.

The term "upholstery part" in the context of the invention describes a means by which the vehicle seat can be upholstered. In this respect, the upholstery part may be provided on the seat part and/or on the backrest part in order to make the vehicle seat more comfortable for a user. The present upholstery part is preferably at least always provided on the seat part.

The term "upholstery core element" in the context of the invention describes a further functional region or a further component of the upholstery part, by which means a particularly good firmness adaptation can be achieved on the upholstery part, both on the seat part and on the backrest part of the vehicle seat.

Advantageously, the upholstery core element is produced from a relatively open-pore and therefore also very air-permeable material, as a result of which, in particular in the region of the direct seat surface, in other words the centre level of the seat part and/or the backrest part, particularly good breathability can be achieved on the vehicle seat.

The upholstery core element preferably comprises a cut foam, a reticulated foam or a spacer fabric, so that it can be produced with good air-permeability characteristics in a structurally simple manner.

In this respect, the present upholstery core element is preferably an upholstery core element having good air permeability.

It is advantageous if the specifically air-permeable upholstery core element is integrated in one piece and only partially in the upholstery part, so that the upholstery core element does not have to underlie the entire seat surface of the vehicle seat. The present upholstery core element preferably extends in the longitudinal direction of the seat part and/or the backrest part approximately centrally in the seat surface of the seat part and/or of the backrest part. Production costs can thus be further reduced.

In this case, the seating comfort can additionally be advantageously adjusted depending on intended use and load on the vehicle seat if the upholstery core element also has a thickness of between 3 mm and 50 mm inclusive, preferably a thickness of between 15 mm and 25 mm inclusive and, ideally, a thickness of between 20 mm and 25 mm inclusive.

It has been found that it is also advantageous if the upholstery core element has a thickness, which is more than double, preferably more than three times, that of the carrier layer element used, since in this way a particularly versatile firmness adaptation can be achieved in the region of the upholstery core element.

It is moreover advantageous if the thickness of the upholstery core element is less than three quarters, preferably half or less, the thickness of the main upholstery element. As a result, it can be ensured that, if the main upholstery element is sufficiently high or thick, the upholstery part as a whole has good inherent strength and therefore sufficient robustness and dimensional stability even at high loads, since the upholstery core element, because of its greater open porosity, is softer than the material of the main upholstery element.

The thicknesses of the upholstery core element, the carrier layer element and the main upholstery element are measured substantially perpendicular to the upholstery cover element or to the flat seat surface in the central level region.

In this respect, a preferred embodiment provides that the air-permeable upholstery core element comprises an open-pore material body as the main upholstery element.

In the present case, the term "main upholstery element" covers any means by which the seat part or the backrest part respectively can be covered and upholstered over a large area with a base upholstery. The main upholstery element is generally produced from a reaction mixture, for example as a cold foam component. However, it may also be produced from other materials, which can be attached well to the seamless, single barrier layer element. In particular, the main upholstery element may also be produced effectively as hot foam upholstery or vacuum foam backing.

In order to prevent a reaction mixture used in this case from unintentionally being able to reach the pores of the air-permeable upholstery core element or the carrier layer element when foam-backing the air-permeable upholstery core element, in particular, it is advantageous if the upholstery core element is spatially separated from the main upholstery element by the barrier layer.

The upholstery cover element may, in the present case, comprise a fabric material conventional for vehicle seats, leather material or the like.

The upholstery cover element is preferably characterized by a thickness of between 0.3 mm and 10 mm inclusive or respectively ideally by a thickness of between 0.6 mm and 6 mm inclusive, as a result of which the softer upholstery core element can be surrounded in a particularly stable manner on the seat surface side and be supported more stably as a whole.

In order to spatially isolate the upholstery cover element, in particular, from its lower unit, in particular relative to the main upholstery element, it is advantageous if a barrier layer is provided for this purpose on the upholstery cover element.

The term "lower unit" in the context of the invention describes, in its entirety, a means of the upholstered vehicle seat part, by which it can be fastened to a support structure of the vehicle seat. In this regard, the lower unit also comprises fastening means, which can also be embedded in the foam of the main upholstery element, such as, for example, iron beams or the like.

Accordingly, an upper unit of the upholstery part is located on the upper side of the lower unit. The term "upper unit" of the upholstery part in the context of the invention describes a material web of the upholstery part at least formed from the upholstery cover element, the carrier layer element, the upholstery core element and the barrier layer element, said material web being placed above the main upholstery element.

The term "strip product" in the context of the invention means that the individual elements, which comprise the material web, can in each case be provided rolled on a coil or the like.

In this respect, an infinite strip product can also be referred to with regard to the present strip product.

The barrier layer may, in the present case, be provided very easily if the barrier layer has a single barrier layer element, which is arranged continuously as a strip product on the main upholstery element. The term "seamless" in the context of the invention means that the single barrier layer element is configured in one piece with a homogeneous continuous base body.

It is furthermore advantageous if the barrier layer element comprises a polyurethane film and, in particular, has a thickness of between 0.25 µm and 1.5 µm. It is obvious that other films may also be advantageously used if they are sufficiently tear resistant. Sufficient tear resistance may be achieved structurally merely in that the film is seamless.

A particularly preferred and advantageous embodiment provides in this case that the barrier layer element is arranged spaced apart from the upholstery core element. As the upholstery core element is substantially only provided centrally with respect to the upholstery part, it is advantageous with regard to a stable and durable secure positioning if the barrier layer element is enclosed on the upper side by the upholstery cover element and on the lower side by the carrier layer element.

Moreover, a pressure load exerted by the upholstery core element on the barrier layer can be more advantageously transmitted to the seamless barrier layer element if a further upholstery element of the upper unit is arranged in between. In this respect, it may be advantageous if a further upholstery part element of the upper unit is arranged between the barrier layer element and the upholstery core element. Surprisingly, the risk of a premature tearing of the barrier layer element at the lateral edges of the smaller upholstery core element can be considerably reduced by this.

The carrier layer element is therefore preferably arranged between the barrier layer element and the upholstery core element, whereby a particularly dimensionally stable and durable layer structure of the upper unit can be achieved on the upholstery part.

In this respect, the present object is also achieved according to a further aspect of the invention by a method for producing an upholstered vehicle seat part, in which at least one upholstery cover element, one carrier layer element for supporting the upholstery cover element and one barrier layer element are connected to one another to form a material web, which can then be made up to form an upper unit of the upholstered vehicle seat part, and in which an upholstery core element, as a strip product, is at least partially embedded between the upholstery cover element and a carrier layer element.

If the upholstery core element is arranged embedded between the upholstery cover element and the carrier layer element, in particular the functionality of the barrier layer element can be ensured for longer. Moreover, a firmness adaptation to the vehicle seat can be further improved if the upholstery core element directly adjoins the upholstery cover element.

It is therefore also advantageous if the upholstery core element is embedded in the upper unit and a single barrier layer element is arranged continuously between the upper unit and the lower unit.

It should also be mentioned in this context that it is also advantageous if the upholstery core element is arranged on the side of the barrier layer element remote from the main upholstery element. As a result, the production process of the upholstery part can be substantially simplified.

The upholstery cover element, the carrier layer element and the barrier layer element are preferably also present as strip products, so the upper unit can advantageously be unrolled from corresponding coils or the like and can then be directly joined together on-line in a suitable joining method, such as, in particular, a thermal adhesive lamination method, flame lamination method or the like. The production method for the upholstery part can thus be configured particularly favourably.

In this respect, a further advantageous embodiment accordingly provides that the upholstery part cover element, the carrier layer element and/or the upholstery core element are produced from one strip product.

An upper unit fully made up from the material web can then be completed more easily in terms of the process to form an upholstery part if a main upholstery element, as a lower unit of the upholstered vehicle seat part, is foamed onto the barrier layer element in such a way that the main upholstery element is arranged on the upholstered vehicle seat part completely separated by means of the seamless and single barrier layer element from all the further upper unit elements.

Moreover, it is advantageous if the barrier layer element is arranged directly on the carrier layer element and/or on the main upholstery element. On the one hand, the barrier layer element can be applied very easily in terms of the process to the carrier layer element, as already explained. On the other hand, the main upholstery element, as mentioned above, may just as easily be foamed onto the barrier layer element in terms of the process.

It also should be noted at this point that it is advantageous if the carrier element can comprise a laminating foam, and can in particular have a thickness of between 1 mm and 10 mm inclusive. In the present case, a laminating foam may be processed particularly effectively together with the barrier layer element, for example as a prefabricated component unit.

A further very advantageous embodiment provides that the upholstery element comprises a ventilation means having at least one ventilation hole, which extends below the air-permeable upholstery core element through the main upholstery element to the preferably substantially air-permeable upholstery core element, the carrier layer element or at least to the barrier layer of the upholstery part. As a result, an operationally reliable air supply with respect to the preferably air-permeable upholstery core element can be ensured in a structurally very simple manner.

A large number of ventilation holes are preferably provided so that a particularly extensive and therefore good ventilation of the upholstery core element can be achieved.

If the barrier layer of the upholstery part has apertures in the region of the ventilation means, in particular in the region of ventilation holes of the ventilation means, the air flowing through the ventilation holes can also pass through the barrier layer without substantial resistance.

In this respect, it is exceptionally advantageous if a barrier layer that is perforated in regions is arranged between, in particular, the upholstery core element and the main upholstery element.

These apertures may already be produced by suitable mould during the foaming of a reaction mixture or else after the foaming, for example by burning, piercing, drilling or milling.

According to a further aspect of the invention, the object thereof is also achieved by the present method for producing an upholstered vehicle seat part, in which at least one ventilation hole for ventilating the upholstery core element is introduced into the main upholstery element. By means of a procedure of this type, the upholstery part for the vehicle seat can be improved and further developed in a particularly simple and economical manner.

A further advantageous variant of the method provides that the barrier layer made of the seamless, single barrier element is applied to the upholstery core element or to the carrier layer element, by means of which barrier layer penetration of a reaction mixture into the pores of the upholstery core element can be effectively prevented.

In order to achieve a particularly good air exchange between the ventilation holes and the upholstery core element or a very good fresh air supply to the upholstery core element, the barrier layer may additionally be pierced at the ventilation holes, if the barrier layer as supplied is not sufficiently air-permeable.

In this context, the object of the invention is also achieved by a generic upholstered vehicle seat part, which is characterized in that the upholstered vehicle seat part has an additional upholstery core element different from the main upholstery element and, in the indirectly adjoining region of which, the main upholstery element has a ventilation means for ventilating the upholstery core element, wherein, ideally, the upholstery core element directly adjoins a carrier layer element of the upholstery cover element, and the upholstery core element is spatially separated from the main upholstery element by the barrier layer and the carrier layer element, at least the barrier layer additionally optionally also being pierced at openings by ventilation holes of the ventilation means. The upholstered vehicle seat part can be provided particularly simply in terms of construction and production by an advantageous structure of this type.

According to a further aspect of the invention, its object is also achieved by using a main upholstery element of an upholstered vehicle seat part as the ventilation means of an upholstery core element arranged close to the main upholstery element, since in order to produce a ventilation means of this type by which, in particular, fresh air is advantageously supplied to the upholstery core element, substantially only the main upholstery element is necessary. Therefore, additional ventilation means components at or in the main upholstery element can advantageously be dispensed with.

Further advantages, aims and characteristics of the present invention will be described with the aid of the accompanying drawings and the following description, in which, by way of an example, a vehicle seat according to the invention with an upholstery part according to the invention is shown and described. In the drawings:

FIG. 1 schematically shows a partly sectional, perspective partial view of a vehicle seat, comprising an upholstery part having a seamless one-part barrier layer element of a barrier layer, which is arranged as a strip product directly on a foamed main upholstery element, but spaced apart from an upholstery core element produced as a strip product;

FIG. 2 schematically shows a cross-sectional view of the upholstery part from FIG. 1; and FIG. 3 schematically shows a view of a preferred cross-sectional form of an alternative seat part.

The vehicle seat 1 shown in FIG. 1 has a seat part 2 and a backrest part 3. Both the seat part 2 and the backrest part 3 are in each case upholstered with an upholstery part 4 and 5 respectively and covered accordingly by them. The upholstery part 4 substantially forms a seat surface 6 of the seat part 2 and the upholstery part 5 forms a seat surface 7 of the backrest part 3 of the vehicle seat 1. With regard to the backrest part 3, lateral cheek upholstery parts 8 and 9 of the backrest are also shown, which are also present with regard to the seat part 2 but are only illustrated schematically as cheek parts 8A and 9A of the seat upholstery in FIG. 3 for the sake of clarity. The structural configuration of the upholstery parts 4 and 5 will be explained below using the representative example of the upholstery part 4 of the seat part 2.

The upholstery part 4 substantially comprises an upholstery cover element 10, a carrier layer element 11 for supporting the upholstery cover element 10, an upholstery core element 12 and a main upholstery element 13, wherein a barrier layer 14 with a single, seamless barrier layer element 15 is arranged between the carrier layer element 11 and the main upholstery element 13, and wherein the main upholstery element 13 is spatially separated by the single, seamless barrier layer element 14 from the carrier layer element 11, from the upholstery core element 12 and the upholstery part cover element 10.

The barrier layer element 14, the carrier layer element 11, the upholstery core element 12 and the upholstery cover element 10 are joined together in each case here as strip products (not provided with a numeral here) collectively by means of a thermal adhesive laminating method to form a total material web 16 and thus in their entirety form an upper unit 17 of the upholstery part 4, while the main upholstery element 13 together with components, not shown further here, provides a lower unit 18 of the upholstery part 4. In this case, the main upholstery element 13 is foamed onto the barrier layer element 15 in such a way that it is applied over the entire area, and therefore continuously and directly, on the main upholstery element 13, specifically both in the longitudinal extent 19 of the seat part 4 and also with regard to the width 20 of the seat part 4 transverse to the longitudinal extent 19.

As can also especially be clearly seen from the view according to FIG. 2, the barrier layer element 15 is arranged spaced apart from the upholstery core element 12 by the carrier layer element 11, wherein the upholstery core element 12 in this embodiment is embedded between the carrier layer element 11 and the upholstery cover element 10. In this respect, the barrier layer element 15 is particularly well protected by the carrier layer element 11 from critical compressive loads with regard to the lateral edge regions 25 and 26 of the upholstery core element 12. Especially when the carrier layer element 11 is produced from a softer material than the upholstery core element 12, compressive loads on the barrier layer element 15 in the edge regions 25, 26 between the upholstery core element 12 and the upholstery cover element 10 can be distributed particularly well over an extensive area on the barrier layer element 15.

The upholstery core element 12, in this embodiment, consists of an open-pore, cold-foamed, cold foam material web 27. The main upholstery element 13, on the other hand, consists of a less open-pore, cold-foamed, cold foam material 28 and is accordingly harder than the upholstery core element 12. The carrier layer element 11 has a laminating foam material web 29, which is selected to be softer than the cold-foamed, cold foam material web 27 of the upholstery core element 12, so the carrier layer element 15 is well protected. The barrier layer element 15 is produced from a polyurethane film web 30. The upholstery cover element 10 is produced from a conventional fabric material web 31. The individual material webs 27, 29, 30 and 31 advantageously facilitate the production, in particular, of the upper unit 17 of the upholstery part 4, as these can be connected to one another on-line to form the upper unit 17. The lower unit 18 with the main upholstery element 13 can then be foamed thereon in a simple manner in terms of the process.

Advantageously, owing to the presently described configuration of the upholstery part 4, two functional regions 40 and 41 spaced apart from one another by the upholstery core element 12 are produced thereon and radially outwardly adjoin a central level region 42 of the seat surface 6.

With regard to the alternative seat part 2A indicated only schematically in FIG. 3, reference is made at this point to the fact that the two lateral functional regions 40 and 41 can be drawn particularly advantageously over the right-hand cheek upholstery part 8A of the seat part or the left-hand cheek upholstery part 9A of the seat part respectively, as the upholstery part 4 has a substantially larger bending capacity or elongation capacity respectively in these two lateral functional regions 40 and 41 than in the central level region 42. This is, in particular, because the upholstery core element 12 associated with the upper unit 17 is substantially limited only to the central level region 42 and does not extend laterally into the two additional functional regions 40 and 41.

It is obvious that the embodiment described above is only a first configuration of the vehicle seat according to the invention or of the upholstered vehicle seat upholstery according to the invention respectively. To this extent, the configuration of the invention is not limited to this embodiment.

All the features disclosed in the application documents are claimed as being essential to the invention, insofar as they are novel individually or in combination compared to the prior art.

LIST OF REFERENCE NUMERALS 1 vehicle seat
2 seat part
2A alternative seat part
3 backrest part
4 upholstery part of the seat part
5 upholstery part of the backrest part
6 seat surface of the seat part
7 seat surface of the backrest part
8 first cheek upholstery part of the backrest part
8A first cheek part of the seat upholstery part
9 second cheek upholstery part of the backrest part
9A second cheek part of the seat upholstery part
10 upholstery cover element
11 carrier layer element
12 upholstery core element
13 main upholstery element
14 barrier layer
15 barrier layer element
16 total material web
17 upper unit
18 lower unit
19 longitudinal extent
20 width
25 first lateral edge region
26 second lateral edge region
27 cold foam material web
28 cold foam material
29 laminating foam material web
30 polyurethane film web
31 fabric material web
40 right-hand functional region
41 left-hand functional region
42 centre level region

The invention claimed is:

1. A vehicle seat having a seat part, having a backrest part and having an upholstery part for upholstering the seat part, wherein the upholstery part comprises an upholstery cover element, a carrier layer element for supporting the upholstery cover element, an upholstery core element, a main upholstery element and a barrier layer, and wherein the main upholstery element has an upper surface with side edges that define a width of the seat part, wherein the main upholstery element is spatially separated by the barrier layer from the carrier layer element, the upholstery core element, and the upholstery cover element, characterized in that the barrier layer is seamless and is positioned continuously and directly on the main upholstery element, wherein the barrier layer is applied over the entire upper surface of the main upholstery element, and therefore continuously and directly on the entire upper surface of the main upholstery element in the longitudinal direction of the seat part and also with regard to a width of the seat part transverse to the longitudinal direction, wherein the upholstery core element is limited to a central level region having a width less than the width of the seat part and does not extend laterally into two additional functional regions.

2. The vehicle seat according to claim 1, wherein the barrier layer is arranged spaced apart from the upholstery core element.

3. The vehicle seat according to claim 1, wherein the barrier layer comprises a polyurethane film and, in particular, has a thickness of between 0.25 μm and 1.5 μm.

4. The vehicle seat according to claim 1, wherein the upholstery core element is arranged embedded between the carrier layer element and the upholstery cover element.

5. The vehicle seat according to claim 1, wherein the upholstery core element comprises a cut foam, a reticulated foam or a spacer fabric and, in particular, has a thickness of between 3 mm and 50 mm.

6. The vehicle seat according to claim 1, wherein the carrier layer element comprises a laminating foam and, in particular, has a thickness of between 1 mm and 10 mm.

7. The vehicle seat according to claim 1, wherein at least one of the upholstery cover element, the carrier layer element and the upholstery core element are produced from a strip product.

8. A vehicle seat comprising:
a seat part;
a backrest part; and
an upholstery part for upholstering the seat part, wherein the upholstery part comprises:
  an upholstery cover element;
  a carrier layer element for supporting the upholstery cover element;
an upholstery core element comprising an open-pore, cold-foamed, cold foam material web, wherein the upholstery core element has a thickness that is more than double a thickness of the carrier layer element;
  a main upholstery element comprising an upper surface with side edges that define a width of the seat part, the main upholstery element comprising a cold-foamed, cold foam material, which is harder and less open pore than the upholstery core element; and
  a barrier layer, wherein the main upholstery element is spatially separated by the barrier layer from the carrier layer element, the upholstery core element, and the upholstery cover element, wherein the barrier layer is seamless and is positioned continuously and directly on the entire upper surface of the main upholstery element and in a longitudinal direction of the seat part and along the width of the seat part, wherein the barrier layer is arranged spaced apart from the upholstery core element, and wherein the upholstery core element extends between the side edges a distance less than the width of the seat part.

9. A vehicle seat comprising:
a seat part;
a backrest part; and
an upholstery part for upholstering the seat part, wherein the upholstery part comprises:
  an upholstery cover element;
  a carrier layer element positioned proximate a lower surface of the upholstery cover element;
  an upholstery core element positioned between the upholstery cover element and the carrier layer element;
  a seamless barrier layer; and
  a main upholstery element having an upper surface interconnected to a first side surface along a longitudinal direction of the seat part and a second side surface along the longitudinal direction interconnected to the upper surface and opposite the first side, wherein the first and second side surfaces define a width of the seat part, and wherein the barrier layer is positioned between the upper surface of the main upholstery element and the carrier layer element, wherein the barrier layer is applied over the entire upper surface, first side surface, and second side surface of the main upholstery element, and wherein the upholstery core element extends between the first and second side surfaces a distance less than the width of the seat part.

* * * * *